(12) United States Patent
Nagle et al.

(10) Patent No.: US 9,451,094 B2
(45) Date of Patent: Sep. 20, 2016

(54) HYBRID CONFERENCE BRIDGE

(75) Inventors: Arnault Nagle, Lannion (FR); Aurélien Sollaud, Treubeurden (FR)

(73) Assignee: Orange, Paris (FR)

( * ) Notice: Subject to any disclaimer, the term of this patent is extended or adjusted under 35 U.S.C. 154(b) by 847 days.

(21) Appl. No.: 12/520,572

(22) PCT Filed: Dec. 5, 2007

(86) PCT No.: PCT/FR2007/052443
§ 371 (c)(1),
(2), (4) Date: Jun. 22, 2009

(87) PCT Pub. No.: WO2008/081130
PCT Pub. Date: Jul. 10, 2008

(65) Prior Publication Data
US 2010/0039963 A1    Feb. 18, 2010

(30) Foreign Application Priority Data
Dec. 22, 2006  (FR) ...................... 06 55908

(51) Int. Cl.
*H04M 3/56*  (2006.01)
*H04L 12/66*  (2006.01)
*H04M 7/00*  (2006.01)

(52) U.S. Cl.
CPC .............. *H04M 7/006* (2013.01); *H04L 12/66* (2013.01); *H04M 3/56* (2013.01); *H04M 3/568* (2013.01); *H04M 2203/5063* (2013.01)

(58) Field of Classification Search
None
See application file for complete search history.

(56) References Cited

U.S. PATENT DOCUMENTS 7,369,515 B2 *   5/2008  Salesky et al. ............... 370/260
2003/0002448 A1 *   1/2003  Laursen et al. ............... 370/261
2005/0088514 A1 *   4/2005  Deleam et al. ............ 348/14.08

FOREIGN PATENT DOCUMENTS

FR           2 831 377 A1      4/2003

OTHER PUBLICATIONS

Rosenberg et al., "Models for Multi Party Conferencing in SIP," Internet Engineering Task Force Internet Draft, pp. 1-21 (Nov. 17, 2000).

* cited by examiner

*Primary Examiner* — Hicham Foud
(74) *Attorney, Agent, or Firm* — Drinker Biddle & Reath LLP

(57) ABSTRACT

Disclosed are hybrid conference bridges capable of selectively operating in a replicating mode or a mixing mode based on the number of terminals in an audio conference capable of supporting the replicating mode. A disclosed conference bridge connects a plurality of terminals in an audio conference and includes a replicating-mode operating module, a mixer-mode operating module, and a management module to activate at least one of the operating modules depending on the number of terminals having sufficient capabilities to support the replicating mode.

9 Claims, 3 Drawing Sheets

HYBRID CONFERENCE BRIDGE

CROSS-REFERENCE TO RELATED APPLICATIONS

This application is the U.S. national phase of the International Patent Application No. PCT/FR2007/052443 filed Dec. 5, 2007, which claims the benefit of French Application No. 06 55908 filed Dec. 22, 2006, the entire content of which is incorporated herein by reference.

FIELD OF THE INVENTION

The present invention relates to a conference bridge intended to connect a plurality of terminals involved in an audio conference.

The invention is applicable in the general context of the development of audio services using IP protocol (IP standing for Internet Protocol), generically called Voice over IP or VoIP.

The invention can be implemented on packet-switched data transport networks, such as the Internet network, that use VoIP-specific signalling protocols to control the management of the calls, such as the SIP (Session Initiation Protocol) and H.323 protocols, and real-time data transport protocols for transporting audio data, such as the RTP protocol (Real-time Transport Protocol).

A particularly advantageous application of the invention relates to VoIP-mode audio conferences.

BACKGROUND OF THE INVENTION

In the context of audio conferences, several audio stream interchange configurations can be envisaged, notably:
distributed-mode multipoint links in which each terminal is responsible for receiving, processing the audio streams that it receives from the terminals of the other participants and sending its audio stream to the latter.
centralized-mode multipoint links in which a sending entity, generally called "conference bridge", manages, within the network, the audio streams addressed to the receiving terminals of the participants. The use of a bridge in an audio conference presents numerous advantages:
reduced signalling message traffic, for example SIP in VoIP mode,
easier management of the conference because of the possibility of inviting or removing participants, broadcasting information, in particular to the participants party to the call, and easily controlling and administering the conference,
for the operators, simplified billing for the services since it is possible to know at all times who is present or absent in the conference.

The invention applies to bridge-centralized multipoint links.

The principle of the bridges is to enable the conference to take place by using a central point either to combine the audio streams according to the mixing principle, or to duplicate and transmit the audio streams according to the replication principle. Two types of bridge are therefore distinguished: bridges operating in mixer mode, or mixer bridges, and bridges operating in replicating mode, or replicating bridges.

According to the mixer bridge operating principle, each transmitting terminal sends an audio stream to the bridge, whether it be of mono, stereo, multichannel, or other type. For each receiving terminal, the bridge mixes all the streams received from the other participants, omitting the contribution of the receiving terminal concerned if it has transmitted a stream. Thus, of N terminals in a conference, each sends its stream to the bridge and receives from the latter a mixed stream from the N−1 others.

The replicating bridge operating principle consists, for each transmitting terminal, in sending an audio stream to the bridge, whether it be of mono, stereo, multichannel, or other type. At the bridge, the stream from each transmitting terminal is transmitted to all the other participants. Thus, each terminal receives from the bridge N−1 streams corresponding to the N−1 other terminals.

It can then be seen that these two types of bridge present very different constraints, according to the number N (it is assumed that N>1) of participating terminals, in terms of bit-rate and CPU computation unit costs for the bridges and the terminals:
The bit-rates outgoing from the bridges are respectively proportional to N for the mixer bridge and to N(N−1) for the replicating bridge. The bit rates incoming at the bridges are proportional to N in both cases.
The bit-rates incoming from the terminals are respectively proportional to 1 for the mixer bridge configuration and to N−1 for the replicating bridge configuration. The bit-rates outgoing at the terminals are proportional to 1 in both cases.
The CPU costs for the mixer bridge are proportional to 2N, that is, N encodings and N decodings. By contrast, they are zero for the replicating bridge.
The CPU costs for the terminals are respectively proportional to 2 for the mixer bridge configuration, or 1 encoding and 1 decoding, and to 1+N for the replicating bridge configuration, or 1 encoding and N−1 decodings.

These figures show that the constraints on the bridge and on the terminals are greater on the replicating bridge configuration when the number of participating terminals increases, except with regard to the CPU costs of the mixer bridge. The mixer bridge is penalized on CPU costs, but it should be noted in this respect that the power of this type of bridge currently increases at an even rate.

Another advantage of the mixer bridge over the replicating bridge is that, if the mixer bridge has a large number of coders-decoders (codecs), the audio conference is transparent in codec terms for the terminals since each terminal receives from the bridge only one coded stream suited to its own codec, whereas, in the case of a replicating bridge, the terminals need to have common codecs, and this is all the more difficult to implement when there is a large number N of terminals.

However, the replicating bridge presents the advantage of avoiding a decoding followed by an encoding on the bridge, which guarantees the absence of loss of audio quality and additional delay, unlike the mixer bridge.

Regarding any sound spatialization, the replicating bridge has the advantage of enabling the terminals to perform a customized spatialization since they have individual download streams from the other terminals, whereas the mixer bridge makes it possible to perform the spatialization on the bridge, and not on the terminals, with the advantage of being able to generate a sound scene common to all the participants.

The above comparisons show that, given the respective advantages and drawbacks of the two types of bridge, it is very difficult to implement an audio conference that is totally satisfactory both with respect to audio quality and with respect to the technical constraints notably associated with the capabilities of the terminals to handle a large number of streams.

SUMMARY OF THE INVENTION

Therefore, one aim of the invention is to propose a conference bridge designed to connect a plurality of terminals participating in an audio conference, that would make it possible to obtain an optimized management of said bridge and of the terminals in all possible situations in said audio conference.

This aim is achieved, according to the invention, by the fact that said conference bridge comprises a replicating-mode operating module, a mixer-mode operating module, and a management module able to activate at least one of said operating modules depending on the number of terminals having sufficient capabilities to support the replicating mode.

Thus, the conference bridge according to the invention is a hybrid bridge that can operate in replicating mode and/or in mixer mode. The criteria for determining whether one and/or the other of the two operating modes should be activated depends in substance on two parameters which are the number of terminals and the ability of the terminals to support the replicating mode. It has already been seen in fact that the replicating mode has the advantage of offering a better audio quality than the mixer mode, but it is limited to a relatively small number of terminals, the latter not generally having sufficient computation and network capabilities to handle a large number of download streams. In this case, the advantage reverts to the mixer mode which requires the terminals to receive and decode only a single download stream.

In other words, it is preferable to give priority to the replicating mode for a small number of participating terminals, which is the case, for example, at the start of a conference, at the moment when the participants are not yet all present.

According to a first embodiment, the replicating-mode operating module is activated for a number of terminals at most equal to a limit number for which the terminals have sufficient capabilities to support the replicating mode, and the mixer-mode operating module is activated for a number of terminals greater than said limit number.

In this embodiment, which will hereinafter be called "fixed management", the bridge switches from a replicating-mode operation to a mixer-mode operation, immediately the number N of terminals participating in the conference exceeds a limit number L.

This embodiment applies well to local networks such as a LAN (Local Area Network) for which the terminals, their activity and their capabilities are known in advance. Obviously, this a priori knowledge of the available hardware is a strong constraint, which, in case of difficulty, can culminate in the exclusion from the conference of certain terminals.

According to a second embodiment, only the replicating-mode operating module is activated as long as the number of terminals is compatible with the capabilities of said terminals to support the replicating mode.

This embodiment will be called "dynamic management" since, unlike in the fixed management mode, account is taken of the fact that the number of participants varies during the audio conference and that the capabilities of the terminals must be reassessed accordingly.

In dynamic management mode, the default operating mode of the hybrid bridge, the subject of the invention, is the replicating mode, because it is that which gives the better result for a small number of participating terminals.

In dynamic management, the entry or the departure of a new participant leads to negotiations between the terminals and the bridge, in order to determine how the bridge will behave towards certain terminals or all the terminals. In this case, no a priori assumption is made concerning the terminals and their capabilities, which represents an advantage over the fixed management.

Initially, the bridge will therefore seek to negotiate the streams, via a signalling protocol such as SIP, so as to maintain the conference between the participants in the replicating mode for as long as possible.

In other words, the bridge will seek to manage both the signalling and the relaying of the media streams. In SIP for example, the negotiation of the streams will be done as for a standard point-to-point SIP call between each participant and the conference bridge. However, the negotiation is differentiated in as much as, for a particular terminal and a particular audio stream, it will be necessary to specify one stream in transmission mode and N−1 in reception mode for the bridge in replicating mode instead of one bi-directional stream in the case of a mixer bridge. For the conference bridge itself, the negotiation will be reversed, namely one stream in reception mode and N−1 in transmission mode for each participant.

If these negotiations are successful for each participating terminal, that is, the audio channels are correctly created with the appropriate codecs, then that means that all the terminals have the capabilities to support this downstream bandwidth and that the limit CPU load for the decoding/mixing processing operations is not reached. All the terminals can thus participate optimally in the conference using the replicating mode.

If at least one of the participating terminals cannot support this load, the invention then provides two variants.

According to a first variant, called "individualized dynamic management", said replicating-mode operating module is activated for the terminals that have sufficient capabilities to support the replicating mode, and said mixer-mode operating module is activated for the terminals that do not have sufficient capabilities to support the replicating mode.

For the terminals that can no longer support the replicating mode, the audio streams will be mixed to form only one thereof, after renegotiation of a media stream. There will therefore be, on one side, terminals that will receive a mixed audio stream because they no longer have sufficient capabilities to support the replicating mode, and on the other side, terminals that receive several audio streams according to the replicating mode that they can process as they like. A total changeover is possible to the mixer mode if, for example, too few terminals continue to operate in replicating mode.

According to a second variant, called "common dynamic management", the replicating-mode operating module is activated if all the terminals have sufficient capabilities to support the replicating mode, and the mixer-mode operating module is activated if at least one terminal does not have sufficient capabilities to support the replicating mode.

The transition to a mixed stream will therefore be renegotiated for all the terminals. In SIP for example, the negotiation of the media streams is done as for a standard point-to-point SIP call between each participant and the conference bridge. The latter is responsible for managing, decoding and mixing the streams coming from the participating terminals and for forwarding the result to each of them.

It should be noted that, in the context of the present description, mixing comprises all the operations that range from standard simple mixing to the options that include various audio processing operations, such as automatic gain control, etc., and spatialization. For the latter, the change of mode requires positions in the restoration spaces to be taken into account. In practice, for a mixer bridge, the spatialization is done on the bridge whereas for a replicating bridge it is done on the terminal. This means, on a change of mode, that the consistency of the locations of the sources is correctly observed. It is therefore necessary to set up a dialogue between the terminal and the bridge using the signalling protocol for example in order for consistency information to be transmitted.

A mixed conference bridge according to the invention therefore does not prevent more complex processing operations, such as spatialization, and conversely enables terminals that have a single speaker and very limited bandwidth or CPU capabilities to participate in the conference, without degrading the quality of those of the others.

BRIEF DESCRIPTION OF THE DRAWINGS

The description that follows in light of the appended drawings, given by way of non-limiting examples, will clearly show what the invention consists of and how it can be implemented.

FIG. 1b is an operating diagram of the hybrid bridge of FIG. 1a.

DETAILED DESCRIPTION

Figure 1A:
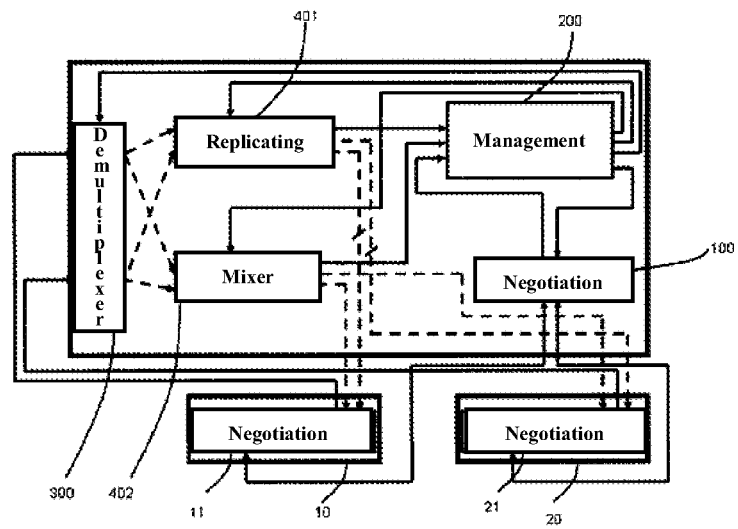
FIG. 1a is a diagram of a hybrid bridge according to the invention.

FIG. 1a represents a hybrid conference bridge designed to connect a plurality of terminals participating in an audio conference, for example a terminal 10 and a terminal 20. This conference bridge comprises:

a negotiation module 100, the role of which is to exchange signalling messages with the terminals 10, 20. It is used to create conferences, negotiate with the negotiation modules 11, 21 of the terminals and deduce therefrom their capabilities. This negotiation module 100 transmits this information to a management module 200 and receives commands from it. These commands are used to respond or to propose alternatives to the proposals of the terminals, depending on whether the hybrid bridge is operating in mixer mode and/or replicating mode for a given conference, an audio demultiplexer module 300 which manages the incoming audio streams from the terminals 10, 20 and sends them, according to the instructions from the management module 200 to a replicating-mode operating module 401, or replicating module, and/or a mixer-mode operating module 402, or mixer module, a replicating module 401, the role of which is to transfer the audio streams from each participating terminal to all the other participating terminals. It is controlled by the management module 200 and sends it information regarding its CPU load or the limits for the outgoing or incoming bit-rate. It receives audio streams via the audio demultiplexer module 300, duplicates them and forwards them to the various terminals, a mixer module 402, the role of which is to mix the various audio streams according to each participant, before sending to it. It is controlled by the management module 200 and sends it information concerning its CPU load or the limits for the outgoing or incoming bit-rate. It receives audio streams via the audio demultiplexer module 300, mixes them and forwards them to the various terminals, a management module 200 which controls the hybrid bridge. It analyses the information received from the various modules and sends commands to the modules. According to the information received concerning in particular the participating terminals and their capabilities to support the replicating mode, it operates in an individualized or common, fixed or dynamic management mode, and decides for each conference that it hosts to activate the replicating modules 401 and/or mixer modules 402.

It should be stressed that the modules 401 and 402 can be different physical entities with different IP addresses, but controlled by an intelligent entity containing the capabilities for dialogue with the terminals using a signalling protocol such as SIP.

Figure 1B:
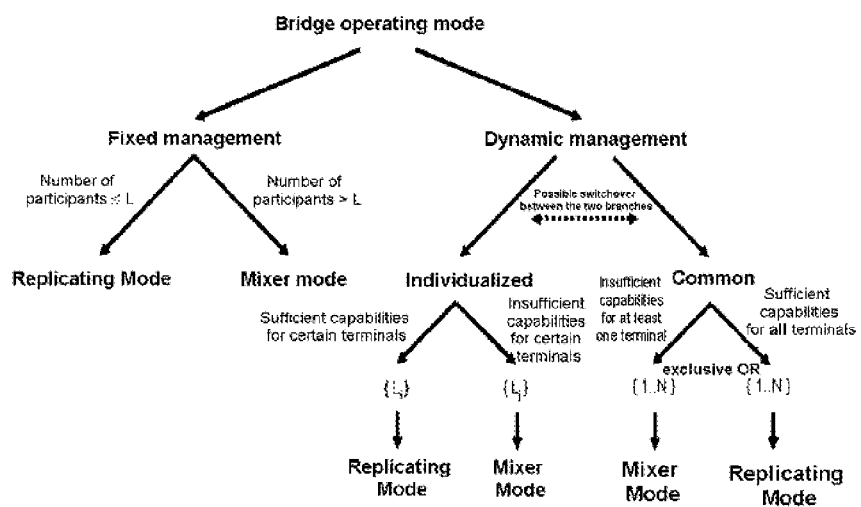

The operating diagram of FIG. 1b summarizes the options available to the management module 200 for deciding on the mode to be activated.

To sum up, in fixed management mode, the choice between replicating module 401 and mixer module 402 is made with respect to a previously determined limit number L. If the number of participating terminals is at most equal to L, the module activated is the replicating module 401 for all the terminals. Conversely, the mixer module 402 is activated for all the participants immediately their number exceeds L.

In individualized dynamic management mode, the replicating module 401 is activated for the terminals that can support the replicating mode, whereas the mixer module 402 is activated for the others.

In common dynamic management mode, the replicating module 401 is activated as long as all the participating terminals have sufficient capabilities to support the replicating mode and, immediately at least one terminal cannot support the replicating mode, the mixer module 402 is activated for all the terminals.

It is possible to switch over from the individualized dynamic management mode to the common dynamic management mode, and vice versa.

The fixed dynamic management modes will now be detailed with reference to FIGS. 2a and 2b.

Figure 2A:
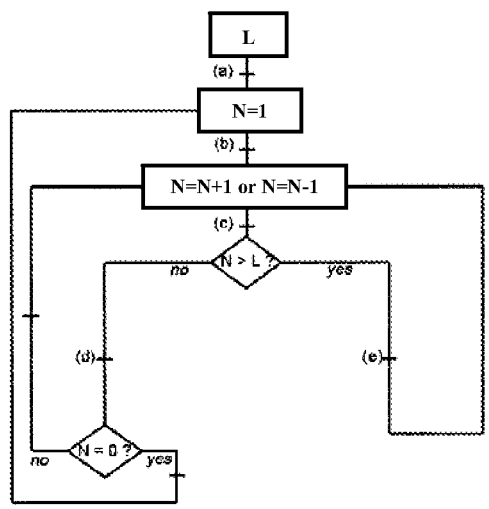
FIG. 2a is an operating diagram of the bridge of FIG. 1 in fixed management mode.

FIG. 2a relates to the fixed management mode.

On initialization (a) of the hybrid bridge, the limit number L of participating terminals defining the switchover from the replicating mode to the mixer mode is known and determined a priori.

In (b), a first participant enters into conference mode.

The negotiation module 100 informs the management module 200 that a conference has just been created with a number of participants N=1.

The management module 200 notifies, on the one hand, the audio demultiplexer 300 that it will receive audio packets to then be sent to the replicating module 401, and on the other hand, the negotiation module 100 that it must negotiate taking into account the replicating mode.

In (c), the arrival of a new participant or the departure of a present participant is envisaged.

The negotiation module 100 notifies the management module 200 that a participant has just joined or left the conference.

The management module 200 notifies the audio demultiplexer 300 that it will receive or stop receiving audio packets for this participant.

In (e), if the arrival of a new participant changes the number N of terminals in the conference from L to L+1, then the mode is changed. The management module 200 commands the mixer module 402 to process the audio streams of the conference and the replicating module 401 to stop the current processing. The audio demultiplexer 300 receives orders accordingly. The negotiation module 100 must negotiate with all the other terminals the transition to mixer mode. If, however, the mixer mode is already active, it remains and the above procedure is not carried out.

The management module 200 notifies the mixer module 402 that it must take into account the arrival or the departure of a participant.

In the case of the arrival of a participant, the management module 200 commands the negotiation module 100 to negotiate with the participant taking into account the mixer mode.

In (d), if the departure of a participant changes the number of terminals in the conference from L+1 to L, then the mode is changed. The management module 200 commands the replicating module 401 to process the audio streams of the conference and the mixer module 402 to stop current processing. The audio demultiplexer 300 receives orders accordingly. The negotiation module 100 must negotiate with all the other terminals the transition to replicating mode. If, however, the replicating mode is already active, it remains and the above procedure is not carried out.

In the case of the arrival of a participant with N still at most equal to L, the management module 200 commands the negotiation module 100 to negotiate with the participant taking into account the replicating mode. The negotiation module 100 must also negotiate with all the other terminals to open additional channels for this new participant.

In the case of the departure of a participant, the negotiation module 100 must negotiate with the remaining terminals the closure of the channels relating to that participant. If N changes to zero, this means that the conference is finished and it is then closed.

The management module 200 notifies the replicating module 401 that it must take account of the arrival or the departure of a participant.

Figure 2B:
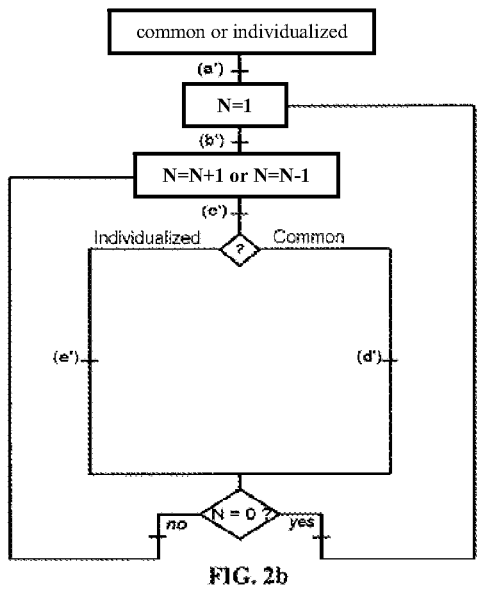
FIG. 2b is an operating diagram of the bridge of FIG. 1 in dynamic management mode.

FIG. 2b relates to the dynamic management mode.

On initialization (a'), the common or individualized management mode is decided.

In (b'), a first participant enters into conference mode.

The negotiation module 100 informs the management module 200 that a conference has just been created with a number of participants N=1.

The management module 200 notifies, on the one hand, the audio demultiplexer 300 that it will receive audio packets to be then sent to the replicating module 401, and on the other hand, the negotiation module 100 that it must negotiate taking into account the replicating mode.

In (c'), the arrival of a new participant or the departure of a present participant is envisaged.

The negotiation module 100 notifies the management module 200 that a participant has just joined or left the conference.

The management module 200 notifies the audio demultiplexer 300 that it will receive or stop receiving audio packets for this participant.

In (d'), the common dynamic management mode is processed.

If the hybrid bridge is in replicating mode and, on arrival of a participant, the management module 200 commands the negotiation module 100 to negotiate with all the participants by taking into account the replicating mode and the additional stream of the new participant. If all the terminals support the replicating mode, nothing changes. The management module 200 notifies the replicating module 401 that it must take account of the arrival of a participant. Otherwise, the management module 200 commands the mixer module 402 that it must process the audio streams of the conference and the replicating module 401 that is must stop current processing. The audio demultiplexer 300 receives orders accordingly. The negotiation module 100 must renegotiate with all the terminals for the transition to mixer mode.

If the hybrid bridge is in mixer mode, and on the departure of a participant, the management module 200 notifies the mixer module 402 that it must take account of the departure of this participant. The management module 200 can ask the negotiation module 100 to renegotiate with all the remaining terminals for a possible transition to the replicating mode. This will be done only if all the remaining terminals support the replicating mode.

If the hybrid bridge is in mixer mode, and on the arrival of a new participant, or if the hybrid bridge is in replicating mode and on the departure of a participant, the modes do not change. In the first case, the management module 200 notifies the mixer module 402 that it must take account of the arrival of a participant and the negotiation module 100 that it must negotiate with the participant taking into account the mixer mode. In the second case, the management module 200 notifies the replicating module 401 that it must take account of the departure of a participant and the negotiation module 100 that it must negotiate with the terminals to close the channels of the departing participant.

In (e'), the individualized dynamic management mode is processed.

In this management mode, the audio demultiplexer 300 sends the received audio streams to the replicating module 401 and/or to the mixer module 402 depending on the modes actually used at that instant.

On the arrival of a new participant, the negotiation module 100 negotiates with this participant taking into account the replicating mode. If the terminal supports this mode, the management module 200 notifies the replicating module 401 to take account of the new participant. Otherwise, the negotiation module 100 negotiates with the terminal taking into account the mixer mode. If the terminal supports this mode, the management module 200 notifies the mixer module 402 to take account of the new participant. The negotiation module 100 must renegotiate with all the terminals using the bridge in replicating mode to open additional channels and, if necessary, make them use the bridge in mixer mode if the negotiation fails.

On the departure of a participant, the management module 200, informed by the negotiation module 100, notifies the mixer module 402 and/or the replicating module 401 that it must take account thereof. It can, if necessary, ask the negotiation module 100 to renegotiate the transition to replicating mode for the terminals that use the mixer mode. For the terminals that use the replicating mode, the channels relating to the departing participant are closed after renegotiation. If N changes to zero, the conference is finished, and is then closed.

If too few participants are in replicating mode, the management module 200 can ask the negotiation module 100 to negotiate taking into account the mixer mode for a given conference.

Figure 3A:
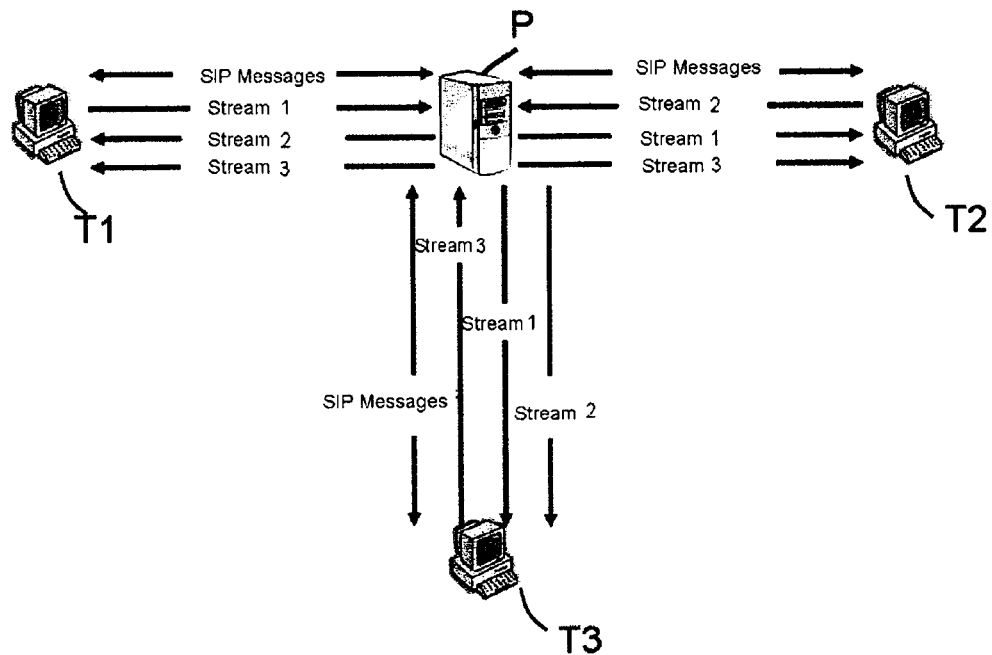
FIG. 3a is a diagram of an example of operation of a hybrid bridge according to the invention in individualized dynamic management mode before the arrival of a new participant.
Figure 3B:
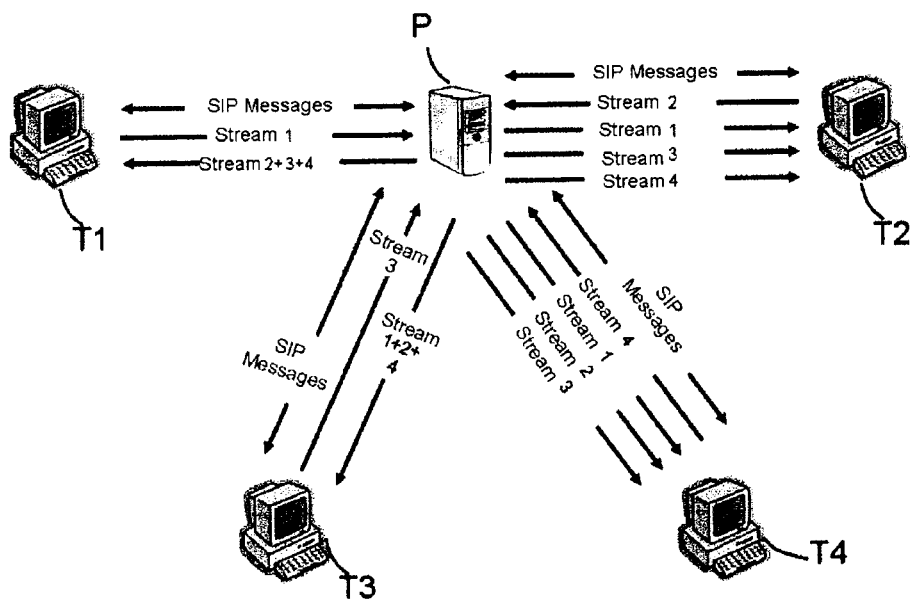
FIG. 3b is a diagram of the example of operation of FIG. 3a after the arrival of a new participant.

There now follows a description with reference to FIGS. 3a and 3b of an exemplary application of the invention to a VoIP-mode spatialized audio conference, with the SIP signalling protocol and a number of terminals in conference, the media streams of which are centralized on a conference bridge according to the invention.

In FIG. 3a, three terminals T1, T2, T3 are in conference and the hybrid bridge P is operating in individualized dynamic management mode with respect to each participant and, by default, in replicating mode. The terminals are capable of receiving and processing the audio streams of the others and, when the stream negotiations have been completed positively, the bridge P remains in replicating mode.

In FIG. 3b, a fourth terminal T4 has joined the conference and SIP renegotiations are being carried out. The terminals T1 and T3 cannot open additional channels, and the hybrid bridge P renegotiates with them a single mixed stream in return according to the mixer mode of the bridge. For the terminals T2 and T4 that have sufficient capabilities, three downstream channels are opened with the bridge P which, for these two terminals, continues to operate in replicating mode. The terminals T2 and T4 can process the audio streams in the way that they want with, for example, a spatialization instead of a simple mixing, without that influencing the terminals T1 and T3.

The invention claimed is:

1. A conference bridge connecting a plurality of N terminals in an audio conference, the conference bridge including a processor and a memory storing instructions to perform the following:
    a replicating-mode operating module for receiving N streams from the N terminals respectively and for sending (N−1) streams from the N streams to at least one terminal;
    a mixer-mode operating module for receiving N streams from the N terminals respectively and for sending a stream mixed with (N−1) streams among the N received streams; and
    a management module that activates the replicating-mode operating module as long as the number of terminals in the audio conference is compatible with the capabilities of the terminals to handle (N−1) download streams; and
wherein when at least one terminal has sufficient capabilities to handle (N−1) download streams and at least one of the terminal does not have sufficient capabilities to handle (N−1) download streams, the management module activates the replicating-mode operating module for the terminals that have sufficient capabilities to handle (N−1) download streams, and activates simultaneously the mixer-mode operating module for the terminals that do not have sufficient capabilities to handle (N−1) download streams.

2. The conference bridge according to claim 1, wherein the activated module for a terminal depends on an ability of the terminals to handle (N−1) download streams.

3. A conference bridge according to claim 1, wherein, following the arrival of an additional terminal, the activated module for a terminal depends on the number of the terminals having sufficient capabilities to handle N download streams.

4. A conference bridge according to claim 3, wherein:
    the replicating mode operating module is activated for at least one of the N terminals before the arrival of an additional terminal; and
    the replicating mode operating module is deactivated for at least one of the N terminals following the arrival of the additional terminal.

5. A conference bridge according to claim 1, wherein, following a departure of a terminal from the audio conference, the activated module for a terminal depends on the number of the terminals having sufficient capabilities to handle (N−2) download streams.

6. A conference bridge according to claim 5, wherein:
    the mixing mode operating module is activated for at least one of the N terminals before the departure of a terminal; and
    the mixing mode operating module is deactivated for at least one of the terminals following the departure of the terminal.

7. A method to bridge a plurality of N terminals in an audio conference, the method comprising:
    determining a number of the terminals having sufficient capabilities to handle (N−1) download streams;
    activating a replicating mode as long as the number of terminals in the audio conference is compatible with the capabilities of the terminals to handle (N−1) download streams;
    activating a mixer-mode for receiving N streams from the N terminals respectively and for sending a stream mixed with (N−1) streams among the N received streams; and
    when at least one terminal has sufficient capabilities to handle (N−1) download streams and at least one terminal does not have sufficient capabilities to handle (N−1) download streams:
        activating the replicating mode for the terminals having sufficient capabilities to handle (N−1) download streams, and
        activating simultaneously the mixer-mode for the terminals that do not have sufficient capabilities to handle (N−1) download streams.

8. A conference bridge comprising:
    a processor; and
    a memory storing instructions that, when executed, cause the processor to at least carry out the method according to claim 7.

9. A method according to claim 7 wherein, following at least one of the arrival of an additional terminal and the departure of a terminal, the steps of determining and activating are implemented with the terminals of the audio conference.

* * * * *